United States Patent
Cheng et al.

(10) Patent No.: US 9,729,370 B2
(45) Date of Patent: Aug. 8, 2017

(54) METHOD AND APPARATUS FOR TRANSMITTING/RECEIVING DATA IN SINGLE CARRIER FREQUENCY DIVISION MULTIPLE ACCESS SYSTEM

(75) Inventors: Jinxia Cheng, Suwon-si (KR); Sang Boh Yun, Seongnam-si (KR); Sung Soo Hwang, Yongin-si (KR); Seung Hee Han, Hwaseong-si (KR); Sunghwan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1170 days.

(21) Appl. No.: 13/255,784

(22) PCT Filed: Mar. 10, 2010

(86) PCT No.: PCT/KR2010/001482
§ 371 (c)(1),
(2), (4) Date: Dec. 12, 2011

(87) PCT Pub. No.: WO2010/104323
PCT Pub. Date: Sep. 16, 2010

(65) Prior Publication Data
US 2012/0076158 A1   Mar. 29, 2012

(30) Foreign Application Priority Data
Mar. 10, 2009 (KR) .......................... 10-2009-0020388

(51) Int. Cl.
*H04J 1/00* (2006.01)
*H04L 27/26* (2006.01)

(52) U.S. Cl.
CPC .................. *H04L 27/2615* (2013.01)

(58) Field of Classification Search
USPC .................................... 370/350, 480
See application file for complete search history.

(56) References Cited

U.S. PATENT DOCUMENTS

| | | | | |
|---|---|---|---|---|
| 2005/0089116 A1* | 4/2005 | Moffatt | ............... | H04L 27/2614 375/295 |
| 2007/0092017 A1* | 4/2007 | Abedi | ................. | H04L 27/2621 375/260 |

(Continued)

Primary Examiner — Gregory Sefcheck
Assistant Examiner — Majid Esmaeilian
(74) Attorney, Agent, or Firm — Jefferson IP Law, LLP (57) ABSTRACT

The present invention provides a method for transmitting and receiving data in a single carrier frequency division multiple access system to which a precoding matrix is applied, and to a transmitting/receiving apparatus for same. The method for transmitting data comprises the steps of: applying selected mapping algorithm (SLM) sequences of an SLM sequence subset corresponding to a precoding matrix, to respective data; selecting the SLM sequence in which each of the applied data has the smallest peak to average power ratio (PAPR) value; and transmitting the index of the selected SLM sequence and data to which the selected SLM sequence is applied. The method for receiving data, to which a precoding matrix is applied, comprises the steps of: receiving the index of the SLM sequence selected from the SLM sequence subset corresponding to the precoding matrix, and data to which the selected SLM sequence is applied; and removing the SLM sequence from the data to which the SLM sequence is applied using the SLM sequence indicated by the index, in order to recover data.

10 Claims, 9 Drawing Sheets

(56) References Cited

U.S. PATENT DOCUMENTS

| | | | |
|---|---|---|---|
| 2007/0189334 A1* | 8/2007 | Awad | H04L 27/2621 370/491 |
| 2008/0043867 A1 | 2/2008 | Blanz et al. | |
| 2008/0089286 A1 | 4/2008 | Malladi et al. | |
| 2008/0225965 A1 | 9/2008 | Pi et al. | |
| 2009/0003308 A1* | 1/2009 | Baxley et al. | 370/350 |
| 2009/0097579 A1* | 4/2009 | Yeon | H04L 27/2614 375/260 |
| 2010/0110875 A1* | 5/2010 | No | H04L 27/2621 370/210 |
| 2010/0150089 A1* | 6/2010 | Yu et al. | 370/329 |
| 2010/0166086 A1* | 7/2010 | Zhou | H04L 27/2618 375/260 |
| 2011/0090972 A1* | 4/2011 | Jong-Seon | H04L 27/2621 375/260 |

* cited by examiner

METHOD AND APPARATUS FOR TRANSMITTING/RECEIVING DATA IN SINGLE CARRIER FREQUENCY DIVISION MULTIPLE ACCESS SYSTEM

TECHNICAL FIELD

The present invention relates to a data transmission/reception method in a Single-Carrier Frequency Division Multiple Access (SC-FDMA) and, in particular, to a data transmission/reception method for reducing Peak to Average Power Ration (PAPR) in the SC-FDMA system using precoding.

BACKGROUND ART

In order to meet the high data rate requirements of the standards for recent mobile communication systems employ, many researches are being conducted on Orthogonal Frequency Division Multiple Access (OFDMA) and Single Carrier-Frequency Division Multiple Access (SC-FDMA) as similar multiple access scheme. In the $3^{rd}$ Generation Partnership Project (3GPP) as asynchronous cellular mobile communication standardization organization, Long Term Evolution (LTE) are being standardized based on the aforementioned multiple access schemes. In LTE, it is considered to adopt OFDM as the Downlink (DL) transmission scheme and SC-FDMA as the Uplink (UL) transmission scheme.

Meanwhile, in LTE-Advanced (LTE-A), a precoding-based Multiple Input Multiple Output (MIMO) is proposed as one of the promising uplink transmission technique for securing stable performance in both the single user and multiuser transmissions. Such a codebook-based precoding technique is considered by some companies to simply modify the LTE system.

Although SC-FDMA is advantageous over OFDMA in that the SC-FDMA signal has lower Peak-To Average Power Ration (PAPR), it shows the following some problems in the precoding-based MIMO system. When precoding is applied to improve stability of the multiple antennas in SC-FDMA, this increases the uplink control signal overhead and particularly the PAPR and requires additional information for indicating the type of precoding. This means that the transmission signals are precoded into the signal combining the values for discriminating the spaces due to the spatial processing made thereon, resulting in increase of PAPR.

DISCLOSURE

Technical Problem

The present invention has been conceived to solve the above problems, and it is an object to provide a data transmission/reception method and apparatus that is capable of reducing PAPR in data transmission/reception with precoding. Also, it is another object of the present invention to provide a data transmission/reception method and apparatus that is capable of reducing control information overhead in use of SLM sequence for reducing PAPR.

Technical Solution

In accordance with an aspect of the present invention, a method for transmitting data to which precoding matrix is applied in a single carrier frequency division multiple access system includes applying SLM sequences of an SLM sequence subset corresponding to the precoding matrix to data; selecting an SLM sequence having a Peak to Average Power Ratio (PAPR) value in application to the data; and transmitting an index of the selected SLM sequence and the data to which the selected SLM sequence is applied.

In accordance with another aspect of the present invention, method for receiving data to which precoding matrix is applied in a single carrier frequency division multiple access system includes receiving an index of an SLM sequence selected from a SLM sequence subset corresponding to the precoding matrix and the data to which the selected SLM sequence is applied; and recovering the data by removing the SLM sequence from the data to which the SLM sequence is applied using the SLM sequence indicated by the index.

In accordance with another aspect of the present invention, an apparatus for transmitting data to which precoding matrix is applied in a single carrier frequency division multiple access system includes a sequence subset unit which stores SLM sequence subsets corresponding to respective precoding matrices; a sequence selector which selects an SLM sequence having least PAPR value in application to the data by applying the SLM sequences of the SLM sequence subset corresponding to a precoding matrix which is applied to the data; an index generator which generates and transmit an index of the selected SLM sequence; and a sequence applier which applies the selected SLM sequence to the data.

In accordance with still another aspect of the present invention, an apparatus for receiving data to which precoding matrix is applied in a single carrier frequency division multiple access system a sequence subset module which provides, when an index of a SLM sequence is received, the SLM sequence indicated by the received index; and a sequence removal module which recovers the data by removing the SLM sequence from the data using the SLM sequence provided by the sequence subset module.

Advantageous Effects

According to the present invention, the transmitter and receiver share the SLM sequence subset corresponding to a certain precoding matrix and use the SLM sequence selected from the SLM sequence subset to reduce PAPR. The present invention is advantageous to reduce the PAPR in precoded data transmission/reception and the information amount for indicating the SLM sequence.

MODE FOR INVENTION

Exemplary embodiments of the present invention are described with reference to the accompanying drawings in detail. Detailed descriptions of well-known functions and structures incorporated herein may be omitted to avoid obscuring the subject matter of the present invention.

The terms and words used in this description and the appended claims are not to be interpreted in common or lexical meaning but, based on the principle that an inventor can adequately define the meanings of terms to best describe his/her own invention, to be interpreted in the meaning and concept conforming to the technical concept of the present invention. Therefore, the embodiments and the constitution illustrated in the attached drawings are merely preferable embodiments according to the present invention, and thus they do not express all of the technical idea of the present invention, so that it should be understood that various equivalents and modifications can exist which can replace the embodiments described in the time of the application.

Figure 1:
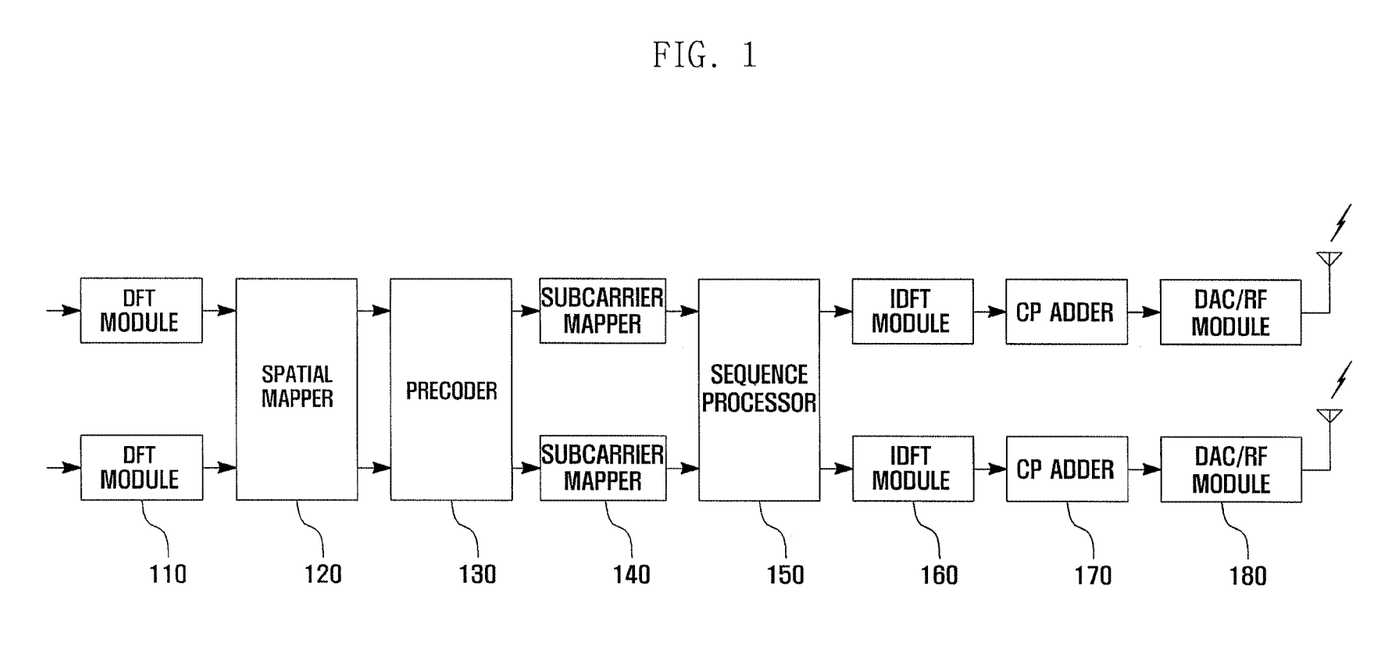
FIG. 1 is a block diagram illustrating a schematic configuration of a transmitter according to an embodiment of the present invention.

A descriptions is made of the configuration of the transmitter for transmitting data to which precoding and SLM sequence are applied according to an embodiment of the present invention. FIG. 1 is a block diagram illustrating a schematic configuration of a transmitter according to an embodiment of the present invention.

Referring to FIG. 1, the transmitter according to an embodiment of the present invention includes Discrete Fourier Transform (DFT) modules 110, a spatial mapper 120, a precoder 130, subcarrier mappers 140, a sequence processor 150, Inverse DFT (IDFT) modules 160, Cyclic Prefix (CP) adders 170, and Digital Analog Converter/Radio Frequency (DAC/RF) modules 180.

The DFT module 110 transforms the time domain signal into frequency domain signal. In case of M-point DFT, M input samples are transformed from time domain to frequency domain. The spatial mapper 120 assigns at least one source to a plurality of antennas. To map the data to the respective antennas (ports) is referred to as spatial mapping. The precoder 130 is used for applying an orthogonal matrix to discriminate data that are combined by a plurality antennas. That is, the precoder applies the precoding vectors as many as the number of antennas. The subcarrier mapper 140 is responsible for mapping the frequency domain data to the appropriate subcarriers. For example, the frequency domain data of M samples are mapped to appropriated subcarriers.

The sequence processor 150 applies the SLM sequence to the precoded data to reduce PAPR. At this time, the sequence processor 150 applies the optimum SLM sequence to the corresponding data according to the precoding vector. The sequence processor 150 according to an embodiment of the present invention store the LSM sequence set including a plurality of SLM sequences. The sequence processor 150 also store the SLM sequence sub-sets corresponding to a plurality of precoding vectors stored in the codebook in the SLM sequence set. That is, the SLM sequence set is the set of all the SLM sequences, and the SLM sequence subset is the subset within the SLM sequence set. The SLM sequence is the sequence for dispersing or reducing the PAPR and applied to the data by scalar multiplication or scrambling. If a precoding matrix to be used for data transmission is selected, the sequence processor 150 extracts all the SLM sequences of the SLM sequence subset corresponding to the precoding matrix and performs scalar multiplication on the individual frequency domain signals, and transforms into time domain signals by means of IDFT. Such signals have different PAPR values. According to an embodiment of the present invention, the sequence processor 150 selects the SLM sequence applied to the data having the least PAPR value and applies the selected SLM sequence to the SLM sequence to the corresponding data.

The IDFT module 160 converts the frequency domain signals into the time domain signals to output in unit of symbol. In case that the input sample size is N bits, the signal is transformed to the time domain signal in unit of N bit input sample. The CP adder 170 adds CP to each symbol for mitigating Inter-Symbol Interference (ISI). The DAC/RF module 180 converts the digital signal to the analog signal and is responsible for transmitting the analog signal on a radio frequency.

Figure 2:
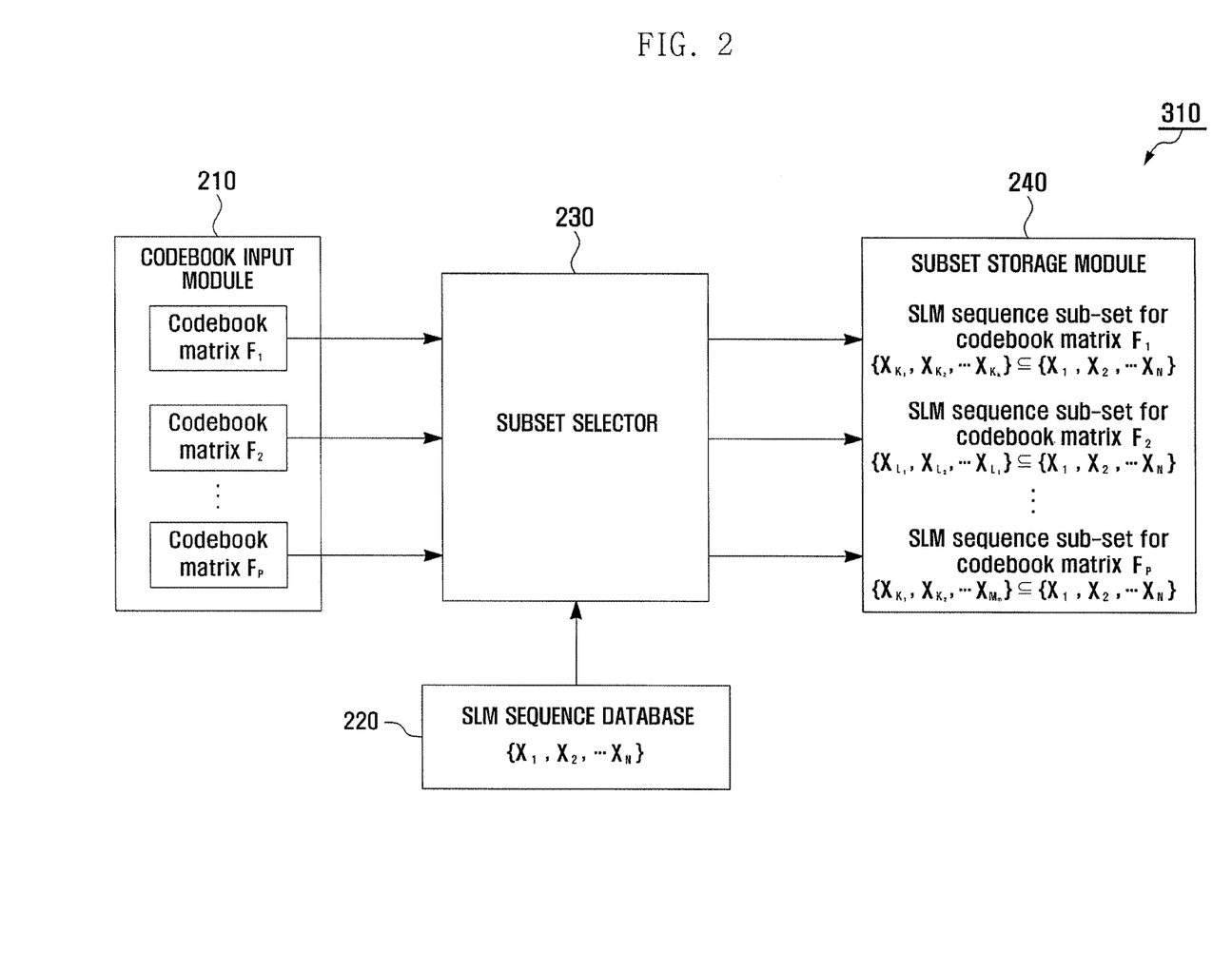
FIG. 2 is a block diagram illustrating the configuration of the transmitter from generating and storing the SLM sequence subsets according to an embodiment of the present invention.
Figure 3:
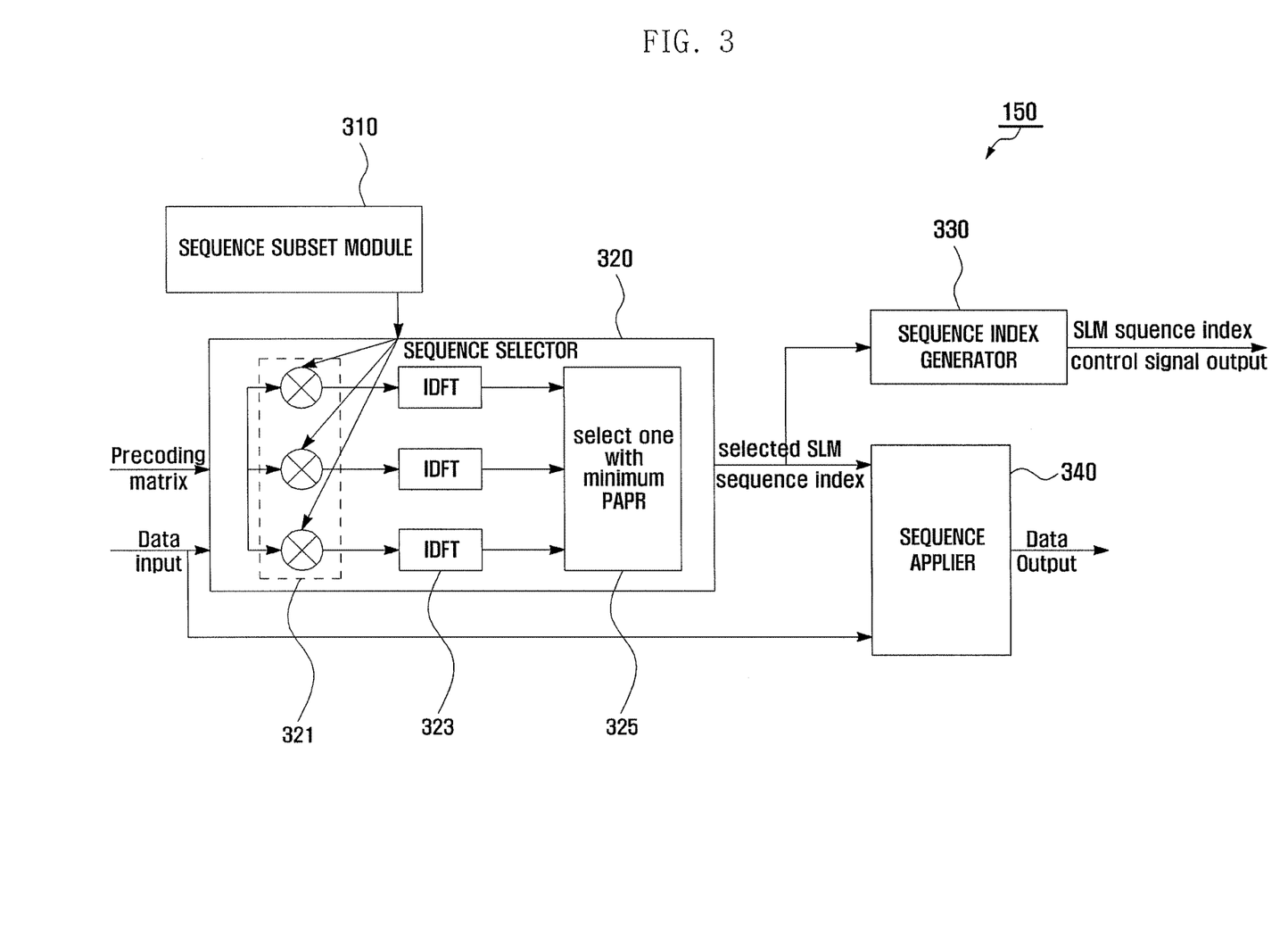
FIG. 3 is a block diagram illustrating a configuration of the transmitter for applying the SLM sequence according to an embodiment of the present invention.

The operations of the sequence processor 310 for reducing PAPR is described in more detail. FIGS. 2 and 3 are block diagram illustrating configurations of the transmitter for applying the SLM sequence according to an embodiment of the present invention. Here, FIG. 2 is a block diagram illustrating the configuration of the transmitter from generating and storing the SLM sequence subsets according to an embodiment of the present invention, and FIG. 3 is a block diagram illustrating a configuration of the transmitter for applying the SLM sequence according to an embodiment of the present invention.

Referring to FIG. 2, the sequence subset module 310 includes a codebook input module 210, an SLM sequence database 220, a subset selector 230, and a subset storage module 240.

The codebook input module 210 inputs the precoding matrix selected according to the rank and number of ports in the codebook shared by the transmitter and receiver to the subset selector 230. Table 1 shows the codebook according to an embodiment of the present invention.

TABLE 1

| No of antenna ports $(M_1, \ldots, M_n)$ | rank | Codebook | | | | | |
|---|---|---|---|---|---|---|---|
| 1 | 1 | $[1]$ | | | | | |
| 2 | 1 | $\begin{bmatrix}1\\0\end{bmatrix}$ | $\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ |
| | 2 | $\frac{1}{\sqrt{2}}\begin{bmatrix}1&0\\0&1\end{bmatrix}$ | $\frac{1}{\sqrt{2}}\begin{bmatrix}1&1\\1&1\end{bmatrix}$ | $\frac{1}{\sqrt{2}}\begin{bmatrix}1&j\\1&-j\end{bmatrix}$ | — | — | — |

TABLE 1-continued

| No of antenna ports $(M_1, \ldots, M_n)$ | rank | Codebook | | | | | |
|---|---|---|---|---|---|---|---|
| 4 | 1 | ... | ... | ... | ... | ... | ... |
|   | 2 | ... | ... | ... | ... | ... | ... |
|   | 3 | ... | ... | ... | ... | ... | ... |
|   | 4 | ... | ... | ... | ... | ... | ... |

As shown in table 1, the codebook is composed of different precoding matrices according to a number of antennas (antenna ports) and rank. The precoding matrices are expresses as $\{F_1, F_2, \ldots, F_P\}$.

The SLM sequence database 220 is the database storing all the SLM sequences (SLM sequence set), and the SLM sequence set is $\{X_1, X_2, \ldots, X_N\}$. the SLM sequence set is input to the subset selector 230.

The subset selector 230 has the precoding matrices and SLM sequence set as its input, and outputs the SLM sequence subsets selected from the SLM sequence set in match with the precoding matrices. For example, the subset selector 230 outputs the SLM sequence subset $\{X_{K_1}, X_{K_2}, \ldots, X_{K_K}\}$ corresponding to the precoding matrix $F_1$, SLM subsequence subset $\{X_{L_1}, X_{L_2}, \ldots, X_{L_L}\}$ corresponding to the precoding matrix $F_2$, the SLM sequence subset $\{X_{M_1}, X_{M_2}, \ldots, X_{M_M}\}$ corresponding to the precoding matrix $F_P$. At this time, the subset selector 230 selects the SLM sequence subset from the SLM sequence set such that the selected SLM sequences can disperse the PAPR in correspondence to the respective precoding matrices. The SLM sequence subset is a part of the SLM sequence set and different SLM sequences can be used for dispersing PAPR according to the precoding matrix such that the SLM sequence subsets have different factors.

The subset storage 240 stores the SLM sequence subsets corresponding to the precoding matrices. The SLM sequence subsets are provided by the subset selector 230.

The SLM sequence subsets are generated and stored such that the SLM sequence set can be modified or regenerated when the codebook is changed. The codebook update period can be configured differently accordingly the service provider.

In case of using the SLM sequences of the aforementioned SLM sequence subsets, the PAPR is dispersed (reduced), and the information amount transmitted from the transmitter to the receiver can be reduced.

It is assumed that the SLM sequence database 220 has total 8 SLM sequences. In no SLM sequence subset is used, the 8 SLM sequences become the candidates for dispersing (reducing) PAPR of the transmit signal and thus the transmitter should provide the receiver with the 3-bit signal as the optimum SLM sequence index for reducing PAPR.

According to an embodiment of the present invention, the SLM sequence subset corresponding to each precoding matrix from the SLM sequence database 220, and the extracted SLM sequence subset are shared by the transmitter and the receiver.

As aforementioned, the slam sequence database stores 8 SLM sequences. Here, the SLM sequence subset corresponding to each precoding matrix includes 4 SLM sequence. This means 4 candidate SLM sequences for dispersing (reducing) PAPR of the transmit signal. The candidates for dispersing (reducing) PAPR of the transmit signal become 4 SLM sequences. Accordingly, in order for the transmitter to select the optimum SLM sequence reducing PAPR from the SLM sequence subset and providing the selected SLM sequence, only 2-bit information is necessary. According to an embodiment of the present invention, the use of SLM sequence reduces PAPR and simultaneously the amount of the SLM sequence index.

As described above, after determining all the SLM sequence subsets, the transmitter determines the SLM sequence to which the precoding matrix is applied and transmits the corresponding data to which the SLM sequence is applied.

Referring to FIG. 3, the sequence processor 150 according to an embodiment of the present invention includes a sequence subset unit 310, a sequence selector 320, a sequence index generator 330, and a sequence applier 340.

As described with reference to FIG. 2, the sequence subset unit (SLM sequence subsets database) 310 generates and stores the SLM sequence subsets corresponding to the precoding matrices. The sequence subset unit 310 can include a SLM sequence subset selection module for receiving codebook matrix as input and selecting the SLM sequence subset and an SLM sequence subset data pool for storing the SLM sequence subsets selected by the module. If the precoding matrix to be applied to the transmit signal is selected, the sequence subset unit 310 provides the sequence selector 320 with the SLM sequence subset corresponding to the selected precoding matrix.

The sequence selector (selected mapping sequence selection module) 320 has the precoding matrix applied to the corresponding data as its input and the SLM sequence subset corresponding to the precoding matrix. The sequence selector 320 measures PAPR by applying the SLM sequences of the SLM sequence subset to the data and selects the SLM sequence with which the least PAPR is measured. That is, the sequences that can minimize the PAPR value are selected as equation (1):

$$\text{Best\_SLM\_sequence\_index} = \underset{i}{\operatorname{argmin}} (PAPR(s_i)) \quad (1)$$

In more detail, the input data is the data multiplied by the precoding matrix, and the sequence selector 320 applies the SLM sequences of the SLM sequence subset to such data. Next, the sequence selector 320 performs IDFT on the data to which the SLM sequence is applied to be transformed to the time domain signal. Next, the sequence selector 320 measures the PAPR of the transformed data in time domain to select the SLM sequence having the least PAPR value.

As described above, in order to select the optimum SLM sequence, the sequence selector 320 includes a multiplier for multiplying the SLM sequences of the SLM sequence subset with the input data, IDFT modules 323 for transforming the SLM sequence-multiplied data to the time domain signal, and a selector 325 for calculating the PAPR value of the data transformed into the time domain signal and selects the SLM sequence having the least PAPR value. The sequence index generator 330 generates the index of the SLM sequence selected by the sequence selector 320 and transmits the index. At this time, the SLM sequence index is preferably transmitted on Physical Uplink Control Channel (PUCCH).

The sequence index generator (selected SLM sequence index generator) 330 receives the selected Ism sequence input by the sequence selector 320 and outputs a SLM sequence index control signal. The sequence applier 340 transmits the data to which the SLM sequence selected by the sequence selector 320 is applied. In an embodiment of the present invention, to apply SLM sequence to the data means to perform scalar product operation. That is, the sequence applier 340 can be a scalar product module. Here, the SLM sequence can be the sequence such as Hadmard code.

Figure 4:
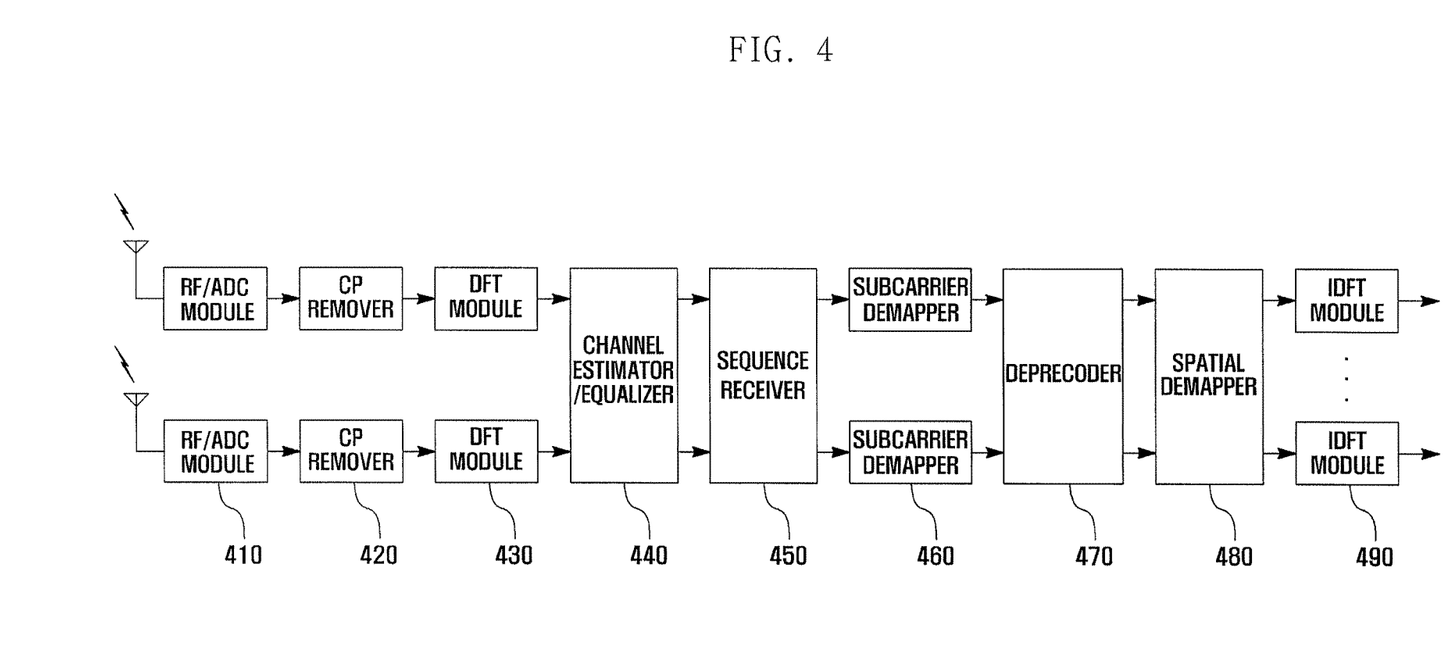
FIG. 4 is a block diagram illustrating a schematic configuration of the receiver according to an embodiment of the present invention.

A description is made of the configuration of a receiver for receiving the SLM sequence-applied data according to an embodiment of the present invention. FIG. 4 is a block diagram illustrating a schematic configuration of the receiver according to an embodiment of the present invention.

Referring to FIG. 4, the receiver according to an embodiment of the present invention includes RF/ADC modules 410, CP removers 420, DFT modules 430, a channel estimator/equalizer 440, a sequence receiver 450, subcarrier demappers 460, a deprecoder 470, a spatial demapper 480, and IDFT modules 490.

The RF/ADC module 410 receives radio frequency signal and converts the received analog signal to the digital signal. The CP remover 420 removes the CP of each symbol from the received data. The DFT module 430 transforms the time domain signal to the frequency domain signal. The channel estimator/equalizer 440 estimates the channel of the received data and compensate the received data for the influence of the channel. The sequence receiver 450 receives the index of the SLM sequence applied to the received data on PUCCH and removes the SLM sequence from the received data using the SLM sequence indicated by the received SLM sequence index. The subcarrier demapper 460 is responsible for separating the frequency domain data into the subcarrier data. The deprecoder 470 performs deprecoding on the data using the precoding applied to the data according to the PMI index shared by the transmitter and receiver. The spatial demapper 480 performs demapping to discriminate between the per-antenna data. The IDFT module 490 performs IDFT on the data as the frequency domain signal to output the time domain signal.

Figure 5:
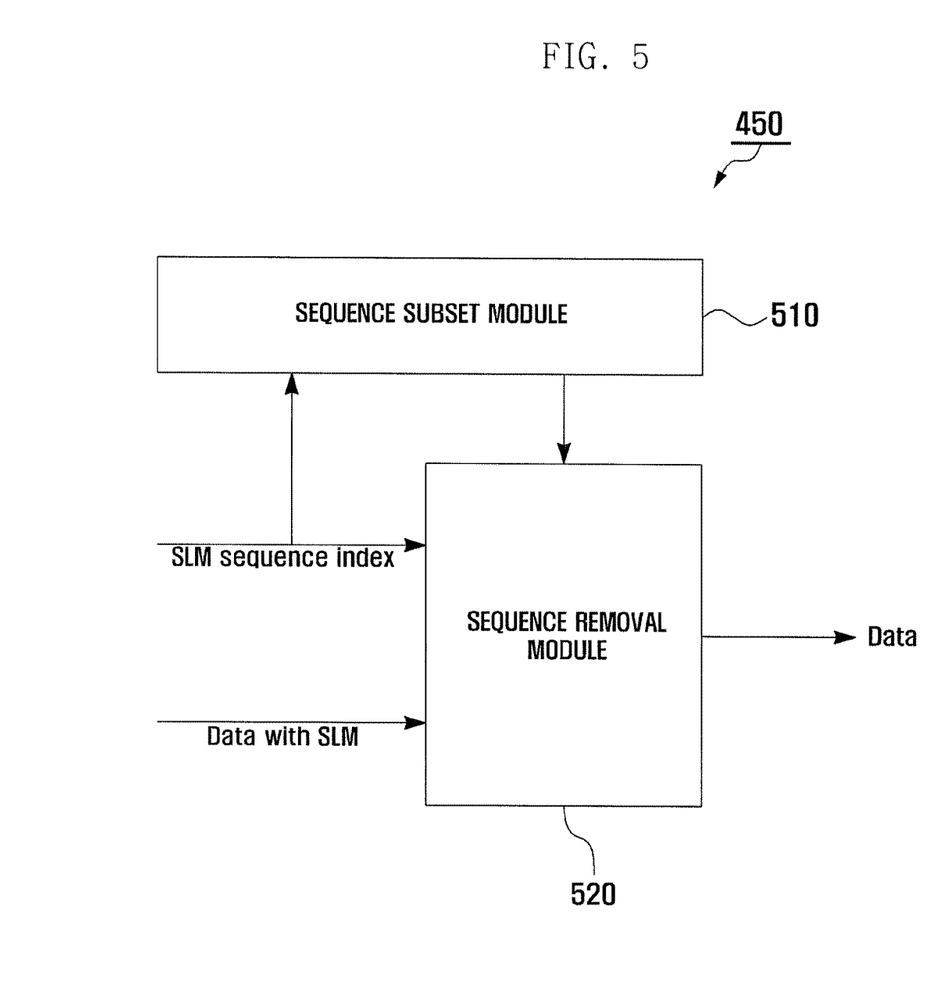
FIG. 5 is a block diagram illustrating a part of the receiver for receiving the data to which other SLM sequence is applied according to an embodiment of the present invention.

FIG. 5 is a block diagram illustrating a part of the receiver for receiving the data to which other SLM sequence is applied according to an embodiment of the present invention.

Referring to FIG. 5, the sequence receiver 450 according to an embodiment of the present invention includes a sequence subset module 510 and a sequence removal module 520. The sequence subset module 510 shares the SLM sequence subsets corresponding to the precoding matrices with the transmitter. If the SLM sequence index is received from the transmitter, the sequence subset module 510 provides the sequence removal module 520 with the SLM sequence indicated by the SLM sequence index. The SLM sequence index can be received on PUCCH. The sequence removal module 520 removes the SLM sequence of the input data using the SLM sequence received from the sequence subset module 510 and outputs the SLM sequence-removed data. As aforementioned, the transmitter and receiver share the SLM sequence subsets corresponding to the precoding matrices such that, when the SLM sequence index of a shared SLM sequence subset is receive, the receiver can remove the SLM sequence from the data with the SLM sequence used by the transmitter.

Figure 6:
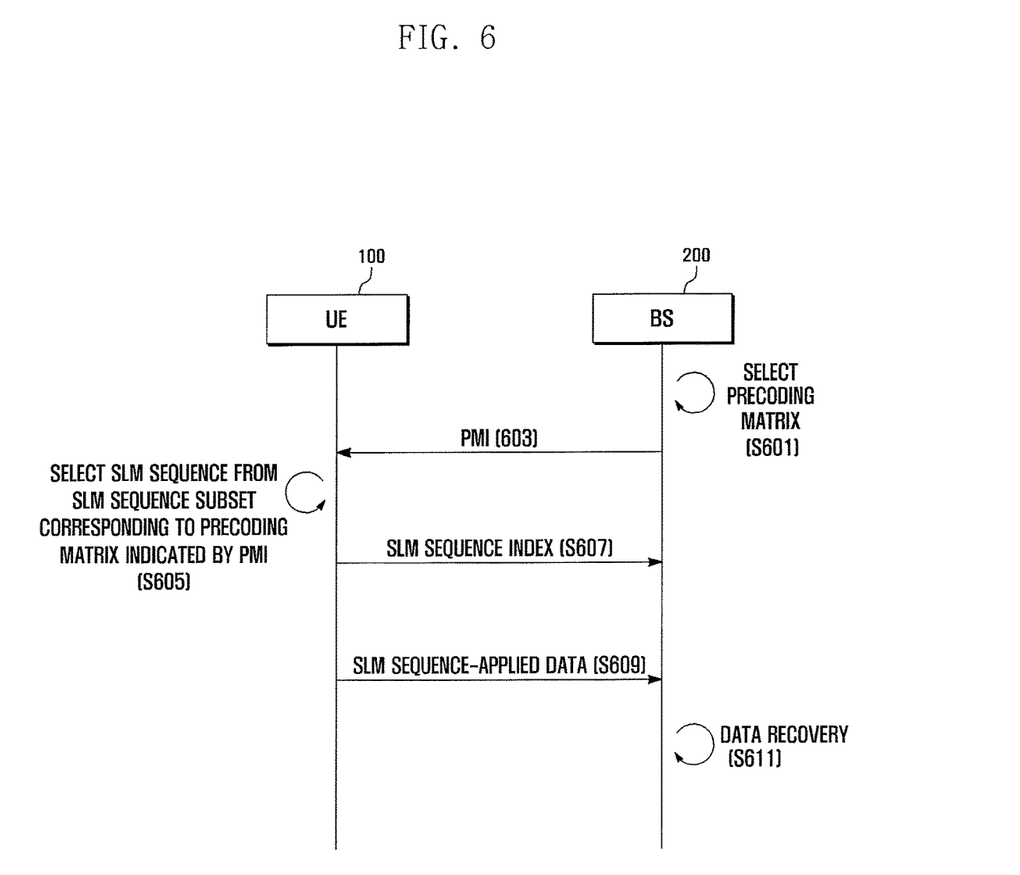
FIG. 6 is signaling diagram illustrating the method for transmitting/receiving SLM sequence-applied data according to an embodiment of the present invention.

A description is made of the method for transmitting/ receiving data to which the SLM sequence is applied according to an embodiment of the present invention. FIG. 6 is signaling diagram illustrating the method for transmitting/ receiving SLM sequence-applied data according to an embodiment of the present invention.

FIG. 6 is described in terms of uplink, and the above described receiver and the transmitter correspond to the base station 200 and User Equipment (UE) 100 in FIG. 6.

Referring to FIG. 6, the base station 200 estimates the channel with the UE 100 and selects the most appropriate precoding matrix at step S601. Next, the base station 200 sends the index (or indicator) of the precoding matrix (PMI, Precoding Matrix Index, or Precoding Matrix Indication) to the UE 100 at step S603. At this time, the base station can transmit the precoding matrix in at least one Data Control Information (DCI) of PDCCH.

If the PMI is received, the UE 100 selects an SLM sequence from the SLM sequence subset corresponding to the precoding matrix indicated by the PMI at step S605. As aforementioned, the SLM sequence having the least PAPR in average is selected according to equation (1). Next, the UE 100 generates the SLM sequence index indicating the selected SLM sequence and sends the SLM sequence index to the base station 200 through PUCCH at step S607. At this time, the data are transmitted on Physical Uplink Shared Channel (PUSCH). That is, if the PMI is received, the UE reads the SLM sequence subset from the database and calculates and find out the SLM sequence with average lowest PAPR for all subscreams. Next, the UE 100 generates uplink SLM sequence index and transmits the uplink SLM sequence index to the base station 200 on PUCCH and the data to which the selected SLM sequence is applied to the base station 200 on PUSCH.

The base station recovers the data by removing the SLM sequence from the data received on PUSCH using the SLM sequence index received on PUSCCH at step S611.

Figure 7:
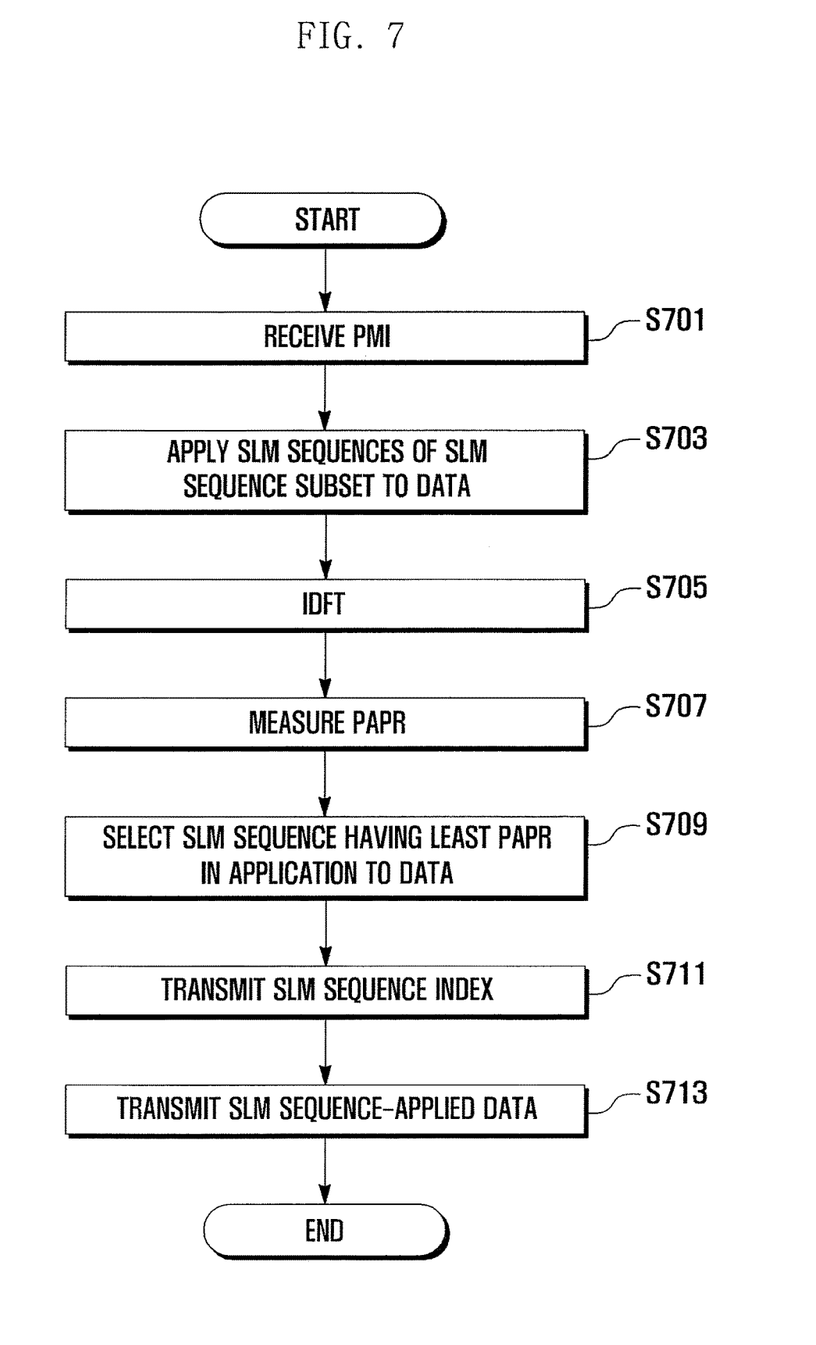
FIG. 7 is a flowchart illustrating the method for transmitting SLM sequence-applied data according to an embodiment of the present invention.

FIG. 7 is a flowchart illustrating the method for transmitting SLM sequence-applied data according to an embodiment of the present invention. In FIG. 7, it is assumed that the UE 100 is the transmitter and base station is the receiver. Also, it is assumed that the UE 110 and the base station 200 share the SLM sequence subsets corresponding to the precoding matrices.

Referring to FIG. 7, the UE 100 receives PMI from the base station 200 at step S701. Next, the UE 100 applies the SLM sequences of the SLM sequence subset corresponding to the precoding matrix indicated by the PMI at step S703. Next, the UE 100 performs IDFT on the data to which the SLM sequences are applied so as to transform the data into time domain signals at step S705. Here, the UE 100 measures the PAPR of the signals at step S707 and selects the SLM sequence which has the least PAPR at step S709. Next, the UE 100 sends the index indicating the selected SLM at step S711 and sends the data to which the selected SLM sequence is applied at step S713.

Figure 8:
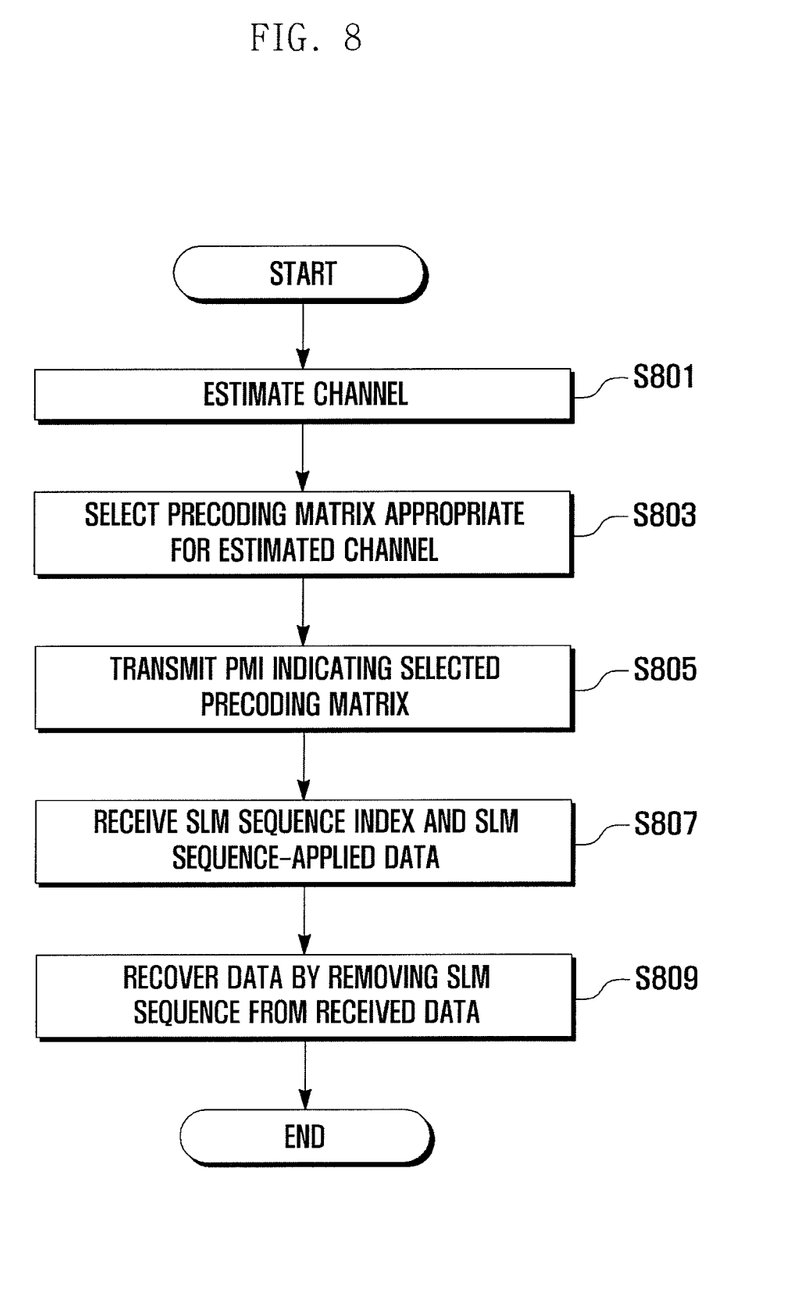
FIG. 8 is a flowchart illustrating the method for receiving the SLM sequence-applied data according to an embodiment of the present invention.

A description is made of the method for receiving the data processed as described above. FIG. 8 is a flowchart illustrating the method for receiving the SLM sequence-applied data according to an embodiment of the present invention. In FIG. 8, it is assumed that the UE 100 is the transmitter and the base station is the receiver. Also, it is assumed that the UE 100 and the base station 200 share the SLM sequence subsets corresponding to the precoding matrices.

Referring to FIG. 8, the base station 200 estimates channel with the UE 100 at step S801 and selects an appropriate precoding matrix according to the estimated channel at step S803. Next, the base station 200 sends PMI indicating the selected precoding matrix at step S805. At this time, the PMI is preferably transmitted on PDCCH. The PMI is transmitted in at least one DCI of PDCCH. As described above, upon receipt of the PMI, the UE 100 selects a SLM sequence subset corresponding to the precoding matrix indicated by the PMI and sends the index of the SLM sequence having the least PAPR value in the SLM sequence subset and the data to which the SLM sequence is applied to the base station 200. Accordingly, the base station 200 receives the SLM sequence index and the SLM sequence-applied data at step S807. Finally, the base station 200 removes the SLM sequence from the received data using the SLM sequence indicated by the SLM sequence index to recover the original data at step S809.

According to the embodiments of the present invention, an SLM sequence is selected from the SLM sequence subset corresponding to the precoding matrix such that the SLM sequence is more adaptive to the precoding matrix. Since the SLM sequence is selected from a SLM sequence subset, the processing delay such as SLM sequence search time for reducing PAPR and IDFT processing time is reduced. Furthermore, the reduction of the information amount in the SLM sequence index can reduce the control signal overhead.

Figure 9:
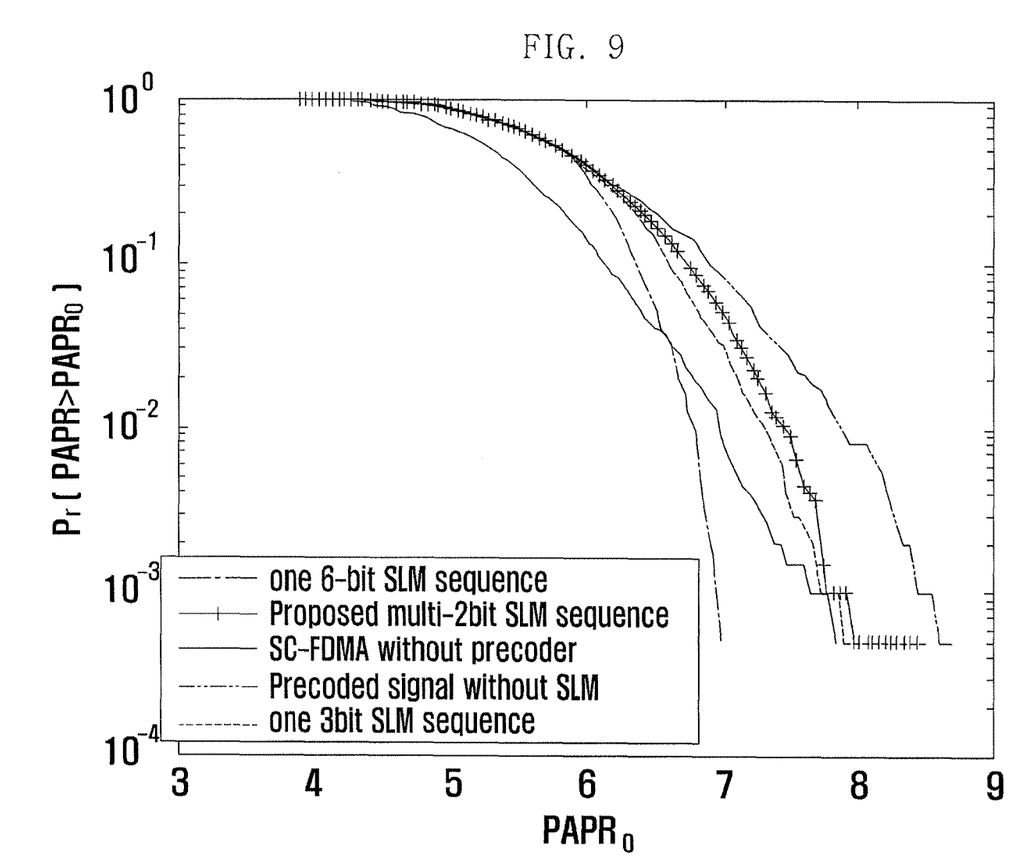
FIG. 9 is a graph illustrating the effect of the method according to an embodiment of the present invention.

FIG. 9 is a graph illustrating the effect of the method according to an embodiment of the present invention. FIG. 9 shows the PAPR performances of the method according to an embodiment of the present invention and conventional methods. (Assume: 5 RBs allocated to each user, IFFT size: 512, LTE 2-antenna port codebook matrixes (Minmax PAPR criterion))

The method according to an embodiment of the present invention (proposed multi-2-bit SLM sequence) has used the SLM sequence subset having 4 SLM sequences. In case of using an SLM sequence set (one 6-bit SLM sequence) having total 64 SLM sequences without using SLM sequence subsets, it shows the best PAPR performance but also the large control signal overhead in the embodiment of the present invention. The method according to an embodiment of the present invention shows the PAPR performance similar to that of the method using the SLM sequence set having total 8 SLM sequences (on 3-bit SLM sequence).

The embodiments disclosed in the specification and drawings aim only to help understand but not limit the present invention. Meanwhile, persons ordinarily skilled in the art would make modifications in terms of specific embodiments and application scopes without departing from the concepts of the present invention.

The invention claimed is:

1. A method for transmitting data by a transmitter, the method comprising:
receiving, from a receiver, a precoding matrix index (PMI) included in downlink control information (DCI) on a physical downlink control channel (PDCCH), the PMI being determined based on an estimated channel;
identifying a selected mapping algorithm (SLM) sequence subset corresponding to the PMI from an SLM sequence set, the SLM sequence subset including a plurality of SLM sequences;
applying the plurality of SLM sequences included in the SLM sequence subset to data;
selecting an SLM sequence having a lowest peak to average power ratio (PAPR) value in application to the data from the SLM sequence subset; and
transmitting an index of the selected SLM sequence and the data to which the selected SLM sequence is applied,
wherein the SLM sequence subset is determined based on the PMI from the SLM sequence set,
wherein an amount of an index indicating an SLM sequence included in the SLM sequence subset is less than an amount of an index indicating an SLM sequence included in the SLM sequence set, and
wherein the SLM sequence subset is changed if a codebook including a precoding matrix indicated by the PMI, which is shared by the transmitter and the receiver, is changed.

2. The method of claim 1, wherein the PMI is determined according to an estimated channel.

3. The method of claim 1, wherein the selecting the SLM sequence further comprises transforming the data to which the plurality of SLM sequences included in the SLM sequence subset is applied into a time domain signal.

4. A method for receiving data of a receiver, the method comprising:
transmitting, to a transmitter, a precoding matrix index (PMI) included in downlink control information (DCI) on a physical downlink control channel (PDCCH), the PMI being determined based on an estimated channel;
identifying a selected mapping algorithm (SLM) sequence subset corresponding to the PMI from an SLM sequence set, the SLM sequence subset including a plurality of SLM sequences;
receiving an index of an SLM sequence selected from the SLM sequence subset and the data to which the selected SLM sequence is applied; and
recovering the data by removing the SLM sequence from the data to which the SLM sequence is applied using the SLM sequence indicated by the index,
wherein the SLM sequence subset is determined based on the PMI from the SLM sequence set,
wherein an amount of an index indicating an SLM sequence included in the SLM sequence subset is less than an amount of an index indicating an SLM sequence included in the SLM sequence set, and
wherein the SLM sequence subset is changed if a codebook including a precoding matrix indicated by the PMI, which is shared by the transmitter and the receiver, is changed.

5. The method of claim 4, wherein the selected SLM sequence comprises an SLM sequence having a lowest peak to average power ratio (PAPR) value in application to the data.

6. An apparatus for transmitting data, the apparatus comprising:
a transceiver configured to transmit and receive a signal; and
a controller configured to:
receive, from a receiver, a precoding matrix index (PMI) included in downlink control information (DCI) on a physical downlink control channel (PDCCH), the PMI being determined based on an estimated channel,
identify a selected mapping algorithm (SLM) sequence subset corresponding to the PMI from an SLM sequence set, the SLM sequence subset including a plurality of SLM sequences,
apply the plurality of SLM sequences included in the SLM sequence subset to data, select an SLM sequence having a lowest peak to average power ratio (PAPR) value in application to the data from the SLM sequence subset, and transmit an index of the selected SLM sequence and the data to which the selected SLM sequence is applied, wherein the SLM sequence subset is determined based on the PMI, wherein an amount of an index indicating an SLM sequence included in the SLM sequence subset is less than an amount of an index indicating an SLM sequence included in the SLM sequence set, and wherein the SLM sequence subset is changed if a codebook including a precoding matrix indicated by the PMI, which is shared by the apparatus and the receiver, is changed.

7. The apparatus of claim 6, wherein the PMI is determined according to an estimated channel.

8. The apparatus of claim 6, wherein the controller is configured to transform the data to which the plurality of SLM sequences included in the SLM sequence subset is applied into a time domain signal.

9. An apparatus for receiving data, the apparatus comprising:

a transceiver configured to transmit and receive a signal; and a controller configured to:

transmit, to a transmitter, a precoding matrix index (PMI) included in downlink control information (DCI) on a physical downlink control channel (PDCCH), the PMI being determined based on an estimated channel, identify a selected mapping algorithm (SLM) sequence subset corresponding to the PMI from an SLM sequence set, the SLM sequence subset including a plurality of SLM sequences, receive an index of an SLM sequence selected from the SLM sequence subset and the data to which the selected SLM sequence is applied, and recover the data by removing the SLM sequence from the data to which the SLM sequence is applied using the SLM sequence indicated by the index, wherein the SLM sequence subset is determined based on the PMI from the SLM sequence set, wherein an amount of an index indicating an SLM sequence included in the SLM sequence subset is less than an amount of an index indicating an SLM sequence included in the SLM sequence set, and wherein the SLM sequence subset is changed if a codebook including a precoding matrix indicated by the PMI, which is shared by the transmitter and the apparatus, is changed.

10. The apparatus of claim 9, wherein the selected SLM sequence comprises an SLM sequence having a lowest peak to average power ratio (PAPR) value in application to the data.

* * * * *